(No Model.)
J. E. GIROUX.
GRAB LINK FOR TRACE CHAINS.
No. 404,615. Patented June 4, 1889.
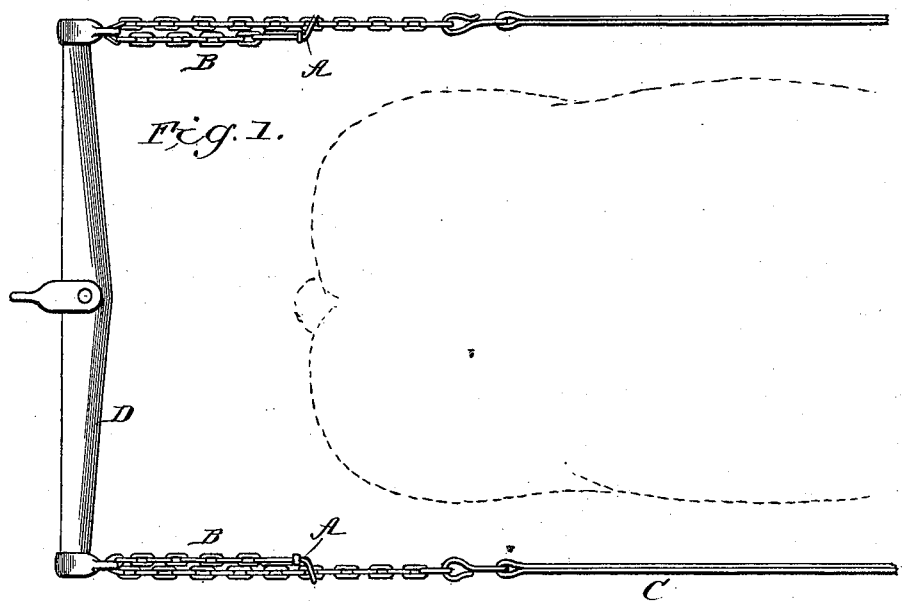
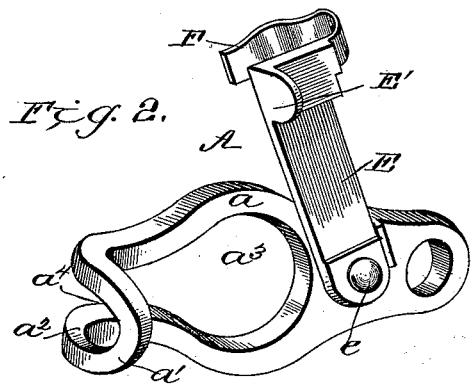
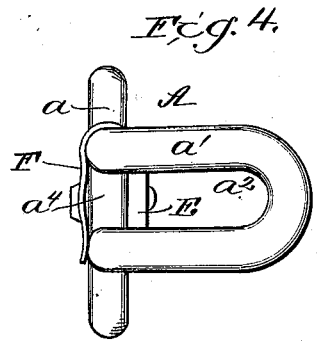
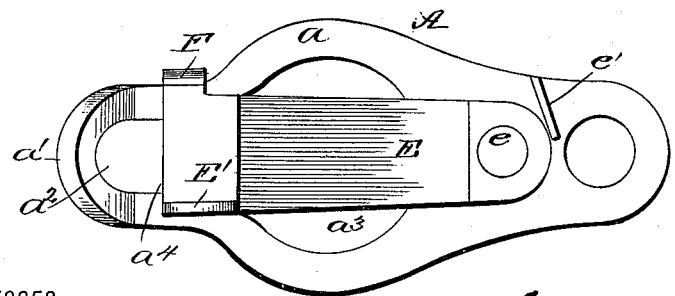
WITNESSES:
Fred G. Dieterich
P. B. Turpin
INVENTOR
J. E. Giroux
BY Munn & Co
ATTORNEY
N. PETERS, Photo-Lithographer, Washington, D. C.

UNITED STATES PATENT OFFICE.

JOSEPH E. GIROUX, OF ALPENA, MICHIGAN.

GRAB-LINK FOR TRACE-CHAINS.

SPECIFICATION forming part of Letters Patent No. 404,615, dated June 4, 1889.

Application filed August 13, 1888. Serial No. 282,508. (No model.)

*To all whom it may concern:*

Be it known that I, JOSEPH E. GIROUX, of Alpena, in the county of Alpena and State of Michigan, have invented certain new and useful Improvements in Grab-Links for Trace-Chains, of which the following is a specification.

My invention is an improvement in grab-links for trace-chains; and it consists, broadly, in a fastening for securing the chain in the gripping portion of said link, and, further, in the novel construction of parts, as will be hereinafter described and claimed.

In the drawings, Figure 1 is a plan view of my invention in connection with the representation of part of a horse and a whiffletree. Fig. 2 is a detail perspective view of the grab-link with the fastening open. Fig. 3 is a side view of the grab-link with the fastening closed, and Fig. 4 is a front end view of the grab-link with the fastening closed.

The grab-link A is formed with a body portion $a$ and gripping portion $a'$, extended, in the construction shown, outward at about right angles from the forward end of the portion $a$, the portion $a'$ having a narrow opening $a^2$, which communicates with the larger opening $a^3$ in the body part $a$. The opening $a^3$ is large enough to permit the free longitudinal movement of the chain B therethrough, while the opening $a^2$ is large enough to admit one of the links of the chain slipped sidewise thereinto from the opening $a^3$, but the said opening $a^2$ is too small to permit any longitudinal movement of the chain when therein.

In the use of grab-links having openings $a^2$ $a^3$ it is found that under some circumstances—as, for instance, when the chain is slacked in going downgrade—the chain will slip from the opening $a^2$ into the opening $a^3$, where the chain can move longitudinally, so that even if on reaching a level the chain should slip back into the opening $a^2$ the connection between the trace C and whiffletree D will have lengthened, resulting in an uneven draft on the opposite traces. To avoid this difficulty is the object of my invention, and to this end I provide a fastening E, for securing the chain in the opening, such fastening being movable across the passage $a^4$ between the openings $a^2$ $a^3$, so that after the chain has been properly adjusted as to length, and is moved from opening $a^3$ into opening $a^2$, the fastening may be closed to secure such chain in said opening $a^2$, as will be understood from the drawings.

In the construction shown the fastening E is a bar pivoted at one end at $e$ to the body part $a$, which is properly formed at its rear end to receive such pivot, and at its opposite or forward end the bar E moves alongside of and closes the passage $a^4$. At its movable end the fastening is provided with a clamp F, which grips the grab-link when the fastening is closed and secures the fastening in such position. This clamp is shown as a spring secured at one end to the fastening-bar and arranged to loop over the top of the link A and press against the opposite side of the link from the bar E, and thus hold the bar E in closed position when so desired, and yet permit such bar to be easily opened when desired, to facilitate which opening I prefer to provide the movable end of the fastening-bar with a lip or flange E', forming a seat for the thumb in pressing such bar open.

It will be seen that the clamp F is so arranged as to form a stop to limit the closing movement of the fastening, and a stop $e'$ is arranged on the link A in position to limit the opening movement of such fastening.

In operation the chain, which is fastened at one end to the rear end of the grab-link, is passed back through the eye on the whiffletree, thence forward through the grab-link, being properly adjusted as to length, and then secured by the fastening, the forward end of the chain being engaged by the hook on the rear end of the trace proper or tug. By the invention it will be seen there is no danger of the trace-chain slipping within the grab-link, so that when once adjusted it may be held securely in such adjustment, and when desired to unhitch it is only necessary to detach the chain from the trace-tug and let such chain hang on the whiffletree.

In practice I prefer to make the grab-links in pairs, rights and lefts, as will be understood from Fig. 1.

Having thus described my invention, what I claim as new, and desire to secure by Letters Patent, is—

1. The improved grab-link herein described, formed with a body part or portion and a gripping portion $a'$, having a narrow opening $a^2$, into which the chain may be slipped sidewise, and a fastening for holding the chain in said opening $a^2$, the latter being adapted to prevent any longitudinal movement of the chain when adjusted, substantially as set forth.

2. The improved grab-link herein described, having a body portion $a$ and gripping portion $a'$, provided, respectively, with openings $a^3$ $a^2$, communicating, as described, and a fastening consisting of a bar pivoted at one end and movable at its other end into position to secure the chain in the opening $a^2$ of portion $a'$, substantially as set forth.

3. The improved grab-link herein described, formed with a body part or portion and with a gripping portion $a'$, and provided with a fastening consisting of a bar pivoted at one end and movable at its other or free end into position to secure the chain in the gripping portion $a'$, and the clamp whereby to hold said free end adjacent to the gripping portion $a'$, substantially as set forth.

4. The grab-link herein described, having a body portion and gripping portion provided, respectively, with openings $a^3$ $a^2$, and provided with a fastening pivoted at one end and provided at its opposite end with a clamp consisting of a spring secured at one end to the fastening and arranged to bear against the opposite side of the link from said fastening, substantially as set forth.

JOSEPH E. GIROUX.

Witnesses:
SOLON C. KEMON,
P. B. TURPIN